(12) United States Patent
Skipor et al.

(10) Patent No.: US 8,128,249 B2
(45) Date of Patent: Mar. 6, 2012

(54) APPARATUS FOR SELECTIVELY BACKLIGHTING A MATERIAL

(75) Inventors: Andrew Skipor, West Chicago, IL (US); Rick Latella, Woodstock, IL (US); Steven Scheifers, Hoffman Estates, IL (US)

(73) Assignee: QD Vision, Inc., Lexington, MA (US)

( * ) Notice: Subject to any disclaimer, the term of this patent is extended or adjusted under 35 U.S.C. 154(b) by 614 days.

(21) Appl. No.: 11/846,360

(22) Filed: Aug. 28, 2007

(65) Prior Publication Data

US 2009/0059554 A1   Mar. 5, 2009

(51) Int. Cl.
*F21V 33/00* (2006.01)

(52) U.S. Cl. .......................................... 362/84; 362/97.2
(58) Field of Classification Search ........................ None
See application file for complete search history.

(56) References Cited

U.S. PATENT DOCUMENTS

| | | | |
|---|---|---|---|
| 3,248,588 A | 4/1966 | Blazek et al. |
| 3,510,732 A | 5/1970 | Amans, et al. |
| 3,774,086 A | 11/1973 | Vincent, Jr. |
| 3,825,792 A | 7/1974 | Rokosz et al. |
| 3,875,456 A | 4/1975 | Kano et al. |
| 4,035,686 A | 7/1977 | Fleming |
| 4,082,889 A | 4/1978 | DiStefano |
| 4,130,343 A | 12/1978 | Miller et al. |
| 4,366,407 A | 12/1982 | Walsh |
| 4,377,750 A | 3/1983 | Pape et al. |
| 4,382,272 A | 5/1983 | Quella et al. |
| 4,608,301 A | 8/1986 | Ishizuka et al. |
| 4,719,386 A | 1/1988 | Toho |
| 4,738,798 A | 4/1988 | Mahler |
| 4,766,526 A | 8/1988 | Morimoto et al. |
| 4,772,885 A | 9/1988 | Uehara et al. |
| 4,780,752 A | 10/1988 | Angerstein et al. |
| 4,820,016 A | 4/1989 | Cohen et al. |
| 4,902,567 A | 2/1990 | Eilertsen et al. |
| 4,929,053 A | 5/1990 | Muller-Stute et al. |
| 4,931,692 A | 6/1990 | Takagi et al. |

(Continued)

FOREIGN PATENT DOCUMENTS

EP   0328202   8/1989

(Continued)

OTHER PUBLICATIONS

Coe-Sullivan, S.,et al, Large-Area Ordered Quantum-Dot Monolayers via Phase Separation During Spin-Casting, Adv. Funct. Mater. 2005, 15, 1117-1124.

(Continued)

*Primary Examiner* — Laura Tso (57) ABSTRACT

A backlighting device (300, 400, 500, 600) emitting light having a first wavelength includes a first radiation emission device (302), e.g., an electroluminescent lamp, for emitting radiation having a second wavelength. A layer (306) of a plurality of photon emitting particles (308), e.g., free standing quantum dots or phosphorus particles, emits light having the first wavelength in response to the first radiation emission device (302), the first wavelength being larger than the second wavelength. A transparent material (116, 120, 122) overlies the layer of a plurality of photon emitting particles (308), wherein the light having a first wavelength passes through the transparent material (116, 120, 122). Optionally, a filter (402) may be placed over the layer (306) to block the radiation having a second wavelength, and a scattering layer (604) may be placed over the layer (306) to scatter wavelength other than the first wavelength.

20 Claims, 4 Drawing Sheets

U.S. PATENT DOCUMENTS

| | | | |
|---|---|---|---|
| 5,064,718 | A | 11/1991 | Buscall et al. |
| 5,077,147 | A | 12/1991 | Tanaka et al. |
| 5,208,462 | A | 5/1993 | O'Connor et al. |
| 5,260,957 | A | 11/1993 | Hakimi et al. |
| 5,294,870 | A | 3/1994 | Tang et al. |
| 5,422,489 | A | 6/1995 | Bhargava |
| 5,434,878 | A | 7/1995 | Lawandy |
| 5,442,254 | A | 8/1995 | Jaskie |
| 5,455,489 | A | 10/1995 | Bhargava |
| 5,470,910 | A | 11/1995 | Spanhel et al. |
| 5,504,661 | A | 4/1996 | Szpak |
| 5,527,386 | A | 6/1996 | Statz |
| 5,534,056 | A | 7/1996 | Kuehnle et al. |
| 5,586,879 | A | 12/1996 | Szpak |
| 5,599,897 | A | 2/1997 | Nishiguchi et al. |
| 5,716,679 | A | 2/1998 | Krug et al. |
| 5,717,289 | A | 2/1998 | Tanaka |
| 5,777,433 | A | 7/1998 | Lester et al. |
| 5,813,752 | A | 9/1998 | Singer et al. |
| 5,813,753 | A | 9/1998 | Vriens et al. |
| 5,847,507 | A | 12/1998 | Butterworth et al. |
| 5,874,803 | A | 2/1999 | Garbuzov et al. |
| 5,881,200 | A | 3/1999 | Burt |
| 5,882,779 | A | 3/1999 | Lawandy |
| 5,909,081 | A | 6/1999 | Eida et al. |
| 5,917,279 | A | 6/1999 | Elschner et al. |
| 5,955,528 | A | 9/1999 | Sato et al. |
| 5,955,837 | A | 9/1999 | Horikx et al. |
| 5,959,316 | A | 9/1999 | Lowery |
| 5,962,971 | A | 10/1999 | Chen |
| 5,975,711 | A | 11/1999 | Parker et al. |
| 5,988,822 | A | 11/1999 | Abe et al. |
| 6,005,342 | A | 12/1999 | Morton |
| 6,023,371 | A | 2/2000 | Onitsuka et al. |
| 6,048,616 | A | 4/2000 | Gallagher et al. |
| 6,066,861 | A | 5/2000 | Hohn et al. |
| 6,117,529 | A | 9/2000 | Leising et al. |
| 6,236,493 | B1 | 5/2001 | Schmidt et al. |
| 6,249,372 | B1 | 6/2001 | Kobayashi et al. |
| 6,259,506 | B1 | 7/2001 | Lawandy |
| 6,322,901 | B1 | 11/2001 | Bawendi et al. |
| 6,350,041 | B1 | 2/2002 | Tarsa et al. |
| 6,358,652 | B1 | 3/2002 | Tomiuchi et al. |
| 6,464,898 | B1 | 10/2002 | Tomoike et al. |
| 6,482,664 | B1 | 11/2002 | Lee et al. |
| 6,501,091 | B1 | 12/2002 | Bawendi et al. |
| 6,515,314 | B1 | 2/2003 | Duggal et al. |
| 6,565,770 | B1 | 5/2003 | Mayer et al. |
| 6,576,155 | B1 | 6/2003 | Barbera-Guillem |
| 6,577,073 | B2 | 6/2003 | Shimizu et al. |
| 6,580,545 | B2 | 6/2003 | Morrison et al. |
| 6,586,096 | B2 | 7/2003 | Border et al. |
| 6,600,175 | B1 | 7/2003 | Baretz et al. |
| 6,608,332 | B2 | 8/2003 | Shimizu et al. |
| 6,608,439 | B1 | 8/2003 | Sokolik et al. |
| 6,613,247 | B1 | 9/2003 | Hohn et al. |
| 6,637,924 | B2 | 10/2003 | Pelka et al. |
| 6,639,733 | B2 | 10/2003 | Minano et al. |
| 6,641,755 | B2 | 11/2003 | Tomoike et al. |
| 6,642,652 | B2 | 11/2003 | Collins, III et al. |
| 6,650,044 | B1 | 11/2003 | Lowery |
| 6,653,778 | B1 | 11/2003 | Tomiuchi et al. |
| 6,677,610 | B2 | 1/2004 | Choi et al. |
| 6,703,781 | B2 | 3/2004 | Zovko |
| 6,710,366 | B1 | 3/2004 | Lee et al. |
| 6,710,911 | B2 | 3/2004 | LoCascio et al. |
| 6,714,711 | B1 | 3/2004 | Lieberman et al. |
| 6,724,141 | B2 | 4/2004 | Andriessen |
| 6,731,359 | B1 | 5/2004 | Fukaya |
| 6,734,465 | B1 | 5/2004 | Taskar et al. |
| 6,744,077 | B2 | 6/2004 | Trottier et al. |
| 6,744,960 | B2 | 6/2004 | Pelka |
| 6,777,706 | B1 | 8/2004 | Tessler et al. |
| 6,781,148 | B2 | 8/2004 | Kubota et al. |
| 6,791,259 | B1 | 9/2004 | Stokes et al. |
| 6,794,686 | B2 | 9/2004 | Chang et al. |
| 6,801,270 | B2 | 10/2004 | Faris et al. |
| 6,803,719 | B1 | 10/2004 | Miller et al. |
| 6,812,500 | B2 | 11/2004 | Reeh et al. |
| 6,819,845 | B2 | 11/2004 | Lee et al. |
| 6,821,559 | B2 | 11/2004 | Eberspacher et al. |
| 6,830,835 | B2 | 12/2004 | Saito et al. |
| 6,835,326 | B2 | 12/2004 | Barbera-Guillem |
| 6,838,743 | B2 | 1/2005 | Yamada et al. |
| 6,864,626 | B1 | 3/2005 | Weiss et al. |
| 6,870,311 | B2 | 3/2005 | Mueller et al. |
| 6,876,796 | B2 | 4/2005 | Garito et al. |
| 6,885,033 | B2 | 4/2005 | Andrews |
| 6,890,777 | B2 | 5/2005 | Bawendi et al. |
| 6,891,330 | B2 | 5/2005 | Duggal et al. |
| 6,903,505 | B2 | 6/2005 | McNulty et al. |
| 6,913,830 | B2 | 7/2005 | Decker et al. |
| 6,914,265 | B2 | 7/2005 | Bawendi et al. |
| 6,924,596 | B2 | 8/2005 | Sato et al. |
| 6,957,608 | B1 | 10/2005 | Hubert et al. |
| 7,005,667 | B2 | 2/2006 | Chen et al. |
| 7,005,669 | B1 | 2/2006 | Lee |
| 7,008,559 | B2 | 3/2006 | Chen |
| 7,029,935 | B2 | 4/2006 | Negley et al. |
| 7,040,774 | B2 | 5/2006 | Beeson et al. |
| 7,042,020 | B2 | 5/2006 | Negley |
| 7,045,956 | B2 | 5/2006 | Braune et al. |
| 7,046,439 | B2 | 5/2006 | Kaminsky et al. |
| 7,065,285 | B2 | 6/2006 | Chen et al. |
| 7,066,623 | B2 | 6/2006 | Lee et al. |
| 7,070,300 | B2 | 7/2006 | Harbers et al. |
| 7,071,616 | B2 | 7/2006 | Shimizu et al. |
| 7,075,225 | B2 | 7/2006 | Baroky et al. |
| 7,078,732 | B1 | 7/2006 | Reeh et al. |
| 7,090,355 | B2 | 8/2006 | Liu et al. |
| 7,091,653 | B2 | 8/2006 | Ouderkirk et al. |
| 7,091,656 | B2 | 8/2006 | Murazaki et al. |
| 7,102,152 | B2 | 9/2006 | Chua et al. |
| 7,123,796 | B2 | 10/2006 | Steckl et al. |
| 7,126,162 | B2 | 10/2006 | Reeh et al. |
| 7,129,515 | B2 | 10/2006 | Okuyama et al. |
| 7,135,816 | B2 | 11/2006 | Kawaguchi et al. |
| 7,144,131 | B2 | 12/2006 | Rains |
| 7,166,010 | B2 | 1/2007 | Lamansky et al. |
| 7,175,948 | B2 | 2/2007 | Yoshihara et al. |
| 7,190,870 | B2 | 3/2007 | Sundar et al. |
| 7,196,354 | B1 | 3/2007 | Erchak et al. |
| 7,199,393 | B2 | 4/2007 | Park et al. |
| 7,213,940 | B1 | 5/2007 | Van De Ven et al. |
| 7,235,792 | B2 | 6/2007 | Elofson |
| 7,239,080 | B2 | 7/2007 | Ng et al. |
| 7,242,030 | B2 | 7/2007 | Wang et al. |
| 7,253,452 | B2 | 8/2007 | Steckel et al. |
| 7,265,488 | B2 | 9/2007 | Ng et al. |
| 7,273,309 | B2 | 9/2007 | Ford et al. |
| 7,279,832 | B2 | 10/2007 | Thurk et al. |
| 7,294,881 | B2 | 11/2007 | Korenari et al. |
| 7,321,193 | B2 | 1/2008 | Antoniadis et al. |
| 7,326,365 | B2 | 2/2008 | Bawendi et al. |
| 7,350,933 | B2 | 4/2008 | Ng et al. |
| 7,374,807 | B2 | 5/2008 | Parce et al. |
| 7,393,618 | B2 | 7/2008 | Ioku et al. |
| 7,420,323 | B2 | 9/2008 | Krummacher |
| 7,430,355 | B2 | 9/2008 | Heikenfeld et al. |
| 7,462,502 | B2 | 12/2008 | Paolini et al. |
| 7,481,562 | B2 | 1/2009 | Chua et al. |
| 7,495,383 | B2 | 2/2009 | Chua et al. |
| 7,497,581 | B2 | 3/2009 | Beeson et al. |
| 7,513,669 | B2 | 4/2009 | Chua et al. |
| 7,534,002 | B2 | 5/2009 | Yamaguchi et al. |
| 7,535,524 | B2 | 5/2009 | Chua et al. |
| 7,553,683 | B2 | 6/2009 | Martin et al. |
| 7,554,257 | B2 | 6/2009 | Krummacher et al. |
| 7,560,747 | B2 | 7/2009 | Cok |
| 7,614,759 | B2 | 11/2009 | Negley |
| 7,645,397 | B2 | 1/2010 | Parce et al. |
| 7,682,850 | B2 | 3/2010 | Harbers et al. |
| 7,686,493 | B2 | 3/2010 | Roshan et al. |
| 7,692,373 | B2 | 4/2010 | Bawendi et al. |
| 7,710,026 | B2 | 5/2010 | Cok et al. |
| 7,723,744 | B2 | 5/2010 | Gillies et al. |
| 7,791,092 | B2 | 9/2010 | Tarsa et al. |

| | | | | | | |
|---|---|---|---|---|---|---|
| 7,791,271 | B2 | 9/2010 | Cok et al. | 2007/0018558 A1 | 1/2007 | Chua et al. |
| 7,799,586 | B2 | 9/2010 | Leung et al. | 2007/0034833 A1 | 2/2007 | Parce et al. |
| 7,888,700 | B2 | 2/2011 | Kahen | 2007/0036510 A1 | 2/2007 | Ingman et al. |
| 7,901,111 | B2 | 3/2011 | Negley et al. | 2007/0036962 A1 | 2/2007 | Sasaki et al. |
| 7,902,748 | B2 | 3/2011 | Cok | 2007/0045777 A1 | 3/2007 | Gillies et al. |
| 7,952,105 | B2 | 5/2011 | Cok | 2007/0071218 A1 | 3/2007 | Zhang |
| 2001/0001207 | A1 | 5/2001 | Shimizu et al. | 2007/0081329 A1 | 4/2007 | Chua et al. |
| 2002/0071948 | A1 | 6/2002 | Duff et al. | 2007/0085092 A1 | 4/2007 | Chen et al. |
| 2002/0127224 | A1 | 9/2002 | Chen | 2007/0087197 A1 | 4/2007 | Jang et al. |
| 2002/0186921 | A1 | 12/2002 | Schumacher et al. | 2007/0090755 A1 | 4/2007 | Eida et al. |
| 2003/0030706 | A1 | 2/2003 | Jagannathan et al. | 2007/0096078 A1 | 5/2007 | Lee et al. |
| 2003/0151700 | A1 | 8/2003 | Carter et al. | 2007/0096634 A1 | 5/2007 | Krummacher |
| 2003/0156425 | A1 | 8/2003 | Turnbull et al. | 2007/0112097 A1 | 5/2007 | Olson et al. |
| 2003/0160260 | A1 | 8/2003 | Hirai et al. | 2007/0112101 A1 | 5/2007 | Choi et al. |
| 2003/0227249 | A1 | 12/2003 | Mueller et al. | 2007/0112118 A1 | 5/2007 | Park et al. |
| 2004/0007169 | A1 | 1/2004 | Ohtsu et al. | 2007/0115995 A1 | 5/2007 | Kim et al. |
| 2004/0233139 | A1 | 11/2004 | Asano et al. | 2007/0121129 A1 | 5/2007 | Eida et al. |
| 2004/0245912 | A1 | 12/2004 | Thurk et al. | 2007/0131905 A1 | 6/2007 | Sato et al. |
| 2004/0259363 | A1 | 12/2004 | Bawendi et al. | 2007/0145350 A1 | 6/2007 | Kobori |
| 2004/0262583 | A1 | 12/2004 | Lee | 2007/0164661 A1 | 7/2007 | Kuma |
| 2005/0012076 | A1 | 1/2005 | Morioka | 2007/0170418 A1 | 7/2007 | Bowers et al. |
| 2005/0088079 | A1 | 4/2005 | Daniels | 2007/0170447 A1 | 7/2007 | Negley et al. |
| 2005/0093422 | A1 | 5/2005 | Wang et al. | 2007/0171188 A1 | 7/2007 | Waites |
| 2005/0093430 | A1 | 5/2005 | Ibetson et al. | 2007/0200492 A1 | 8/2007 | Cok et al. |
| 2005/0098787 | A1 | 5/2005 | Andrews | 2007/0201056 A1 | 8/2007 | Cok et al. |
| 2005/0134723 | A1 | 6/2005 | Lee et al. | 2007/0223219 A1 | 9/2007 | Medendorp et al. |
| 2005/0135079 | A1 | 6/2005 | Yin Chua et al. | 2007/0235751 A1 | 10/2007 | Radkov et al. |
| 2005/0139852 | A1 | 6/2005 | Chen et al. | 2007/0241661 A1 | 10/2007 | Yin |
| 2005/0180680 | A1 | 8/2005 | Kong | 2007/0246734 A1 | 10/2007 | Lee et al. |
| 2005/0214967 | A1 | 9/2005 | Scher et al. | 2007/0263408 A1 | 11/2007 | Chua et al. |
| 2005/0236556 | A1 | 10/2005 | Sargent et al. | 2007/0281140 A1 | 12/2007 | Haubrich et al. |
| 2005/0261400 | A1 | 11/2005 | Yang et al. | 2007/0298160 A1 | 12/2007 | Jang et al. |
| 2005/0265404 | A1 | 12/2005 | Ashdown | 2008/0001124 A1 | 1/2008 | Hachiya et al. |
| 2005/0271548 | A1 | 12/2005 | Yang et al. | 2008/0001528 A1 | 1/2008 | Eida |
| 2005/0272159 | A1 | 12/2005 | Ismagilov et al. | 2008/0012031 A1 | 1/2008 | Jang et al. |
| 2005/0275615 | A1 | 12/2005 | Kahen et al. | 2008/0029710 A1 | 2/2008 | Sekiya et al. |
| 2005/0279949 | A1 | 12/2005 | Oldham et al. | 2008/0048936 A1 | 2/2008 | Powell et al. |
| 2006/0001036 | A1 | 1/2006 | Jacob et al. | 2008/0057342 A1 | 3/2008 | Sekiya |
| 2006/0002101 | A1* | 1/2006 | Wheatley et al. ............... 362/84 | 2008/0070153 A1 | 3/2008 | Ioku et al. |
| 2006/0003097 | A1 | 1/2006 | Andres et al. | 2008/0074050 A1 | 3/2008 | Chen et al. |
| 2006/0003114 | A1 | 1/2006 | Enlow et al. | 2008/0144333 A1 | 6/2008 | Gourlay |
| 2006/0003156 | A1 | 1/2006 | Masutani et al. | 2008/0165235 A1 | 7/2008 | Rolly et al. |
| 2006/0024525 | A1 | 2/2006 | Jeong et al. | 2008/0169753 A1 | 7/2008 | Skipor et al. |
| 2006/0034065 | A1 | 2/2006 | Thurk | 2008/0172197 A1 | 7/2008 | Skipor et al. |
| 2006/0057480 | A1 | 3/2006 | Lin et al. | 2008/0173886 A1 | 7/2008 | Cheon et al. |
| 2006/0060862 | A1 | 3/2006 | Bawendi et al. | 2008/0237540 A1 | 10/2008 | Dubrow |
| 2006/0063289 | A1 | 3/2006 | Negley et al. | 2008/0254210 A1 | 10/2008 | Lai et al. |
| 2006/0066210 | A1 | 3/2006 | Ng et al. | 2008/0277626 A1 | 11/2008 | Yang et al. |
| 2006/0068154 | A1 | 3/2006 | Parce et al. | 2008/0297028 A1 | 12/2008 | Kane et al. |
| 2006/0081862 | A1 | 4/2006 | Chua et al. | 2008/0308825 A1 | 12/2008 | Chakraborty et al. |
| 2006/0103589 | A1 | 5/2006 | Chua et al. | 2009/0001385 A1 | 1/2009 | Skipor et al. |
| 2006/0105483 | A1 | 5/2006 | Leatherdale et al. | 2009/0017268 A1 | 1/2009 | Skipor et al. |
| 2006/0113895 | A1 | 6/2006 | Baroky et al. | 2009/0021148 A1 | 1/2009 | Hachiya et al. |
| 2006/0145599 | A1 | 7/2006 | Stegamat et al. | 2009/0034292 A1 | 2/2009 | Pokrovskiy et al. |
| 2006/0147703 | A1 | 7/2006 | Walker et al. | 2009/0050907 A1 | 2/2009 | Yuan et al. |
| 2006/0157686 | A1 | 7/2006 | Jang et al. | 2009/0057662 A1 | 3/2009 | Brazis et al. |
| 2006/0157720 | A1 | 7/2006 | Bawendi et al. | 2009/0114932 A1 | 5/2009 | Chou |
| 2006/0169971 | A1 | 8/2006 | Cho et al. | 2009/0152567 A1 | 6/2009 | Comerford et al. |
| 2006/0197437 | A1 | 9/2006 | Krummacher et al. | 2009/0162011 A1 | 6/2009 | Coe-Sullivan et al. |
| 2006/0199886 | A1 | 9/2006 | Ryang | 2009/0196160 A1 | 8/2009 | Crombach et al. |
| 2006/0204676 | A1 | 9/2006 | Jones et al. | 2009/0208753 A1 | 8/2009 | Coe-Sullivan et al. |
| 2006/0204679 | A1 | 9/2006 | Jones et al. | 2009/0215208 A1 | 8/2009 | Coe-Sullivan et al. |
| 2006/0210726 | A1 | 9/2006 | Jones et al. | 2009/0236621 A1 | 9/2009 | Chakraborty |
| 2006/0214903 | A1 | 9/2006 | Kurosaka | 2009/0321755 A1 | 12/2009 | Jang et al. |
| 2006/0215958 | A1 | 9/2006 | Yeo et al. | 2010/0002414 A1 | 1/2010 | Meir et al. |
| 2006/0221021 | A1 | 10/2006 | Hajjar et al. | 2010/0014799 A1 | 1/2010 | Bulovic et al. |
| 2006/0227546 | A1 | 10/2006 | Yeo et al. | 2010/0051898 A1 | 3/2010 | Kim et al. |
| 2006/0232725 | A1 | 10/2006 | Chua et al. | 2010/0067214 A1 | 3/2010 | Hoelen et al. |
| 2006/0238103 | A1 | 10/2006 | Choi et al. | 2010/0068468 A1 | 3/2010 | Coe-Sullivan et al. |
| 2006/0238671 | A1 | 10/2006 | Kim et al. | 2010/0103648 A1 | 4/2010 | Kim et al. |
| 2006/0244367 | A1 | 11/2006 | Im et al. | 2010/0110728 A1 | 5/2010 | Dubrow et al. |
| 2006/0245710 | A1 | 11/2006 | Borrelli et al. | 2010/0113813 A1 | 5/2010 | Pickett et al. |
| 2006/0274226 | A1 | 12/2006 | Im et al. | 2010/0123155 A1 | 5/2010 | Pickett et al. |
| 2006/0279296 | A1 | 12/2006 | Lee et al. | 2010/0142182 A1 | 6/2010 | Van Woudenberg et al. |
| 2007/0012928 | A1 | 1/2007 | Peng et al. | 2010/0144231 A1 | 6/2010 | Landry et al. |
| 2007/0012941 | A1 | 1/2007 | Cheon | 2010/0149814 A1 | 6/2010 | Zhai et al. |
| 2007/0013996 | A1 | 1/2007 | Verma | 2010/0155749 A1 | 6/2010 | Chen et al. |
| 2007/0014318 | A1 | 1/2007 | Hajjar et al. | 2010/0167011 A1 | 7/2010 | Dubrow |
| 2007/0018102 | A1 | 1/2007 | Braune et al. | 2010/0193806 A1 | 8/2010 | Byun |

| | | | |
|---|---|---|---|
| 2010/0208493 | A1 | 8/2010 | Choi et al. |
| 2010/0243053 | A1 | 9/2010 | Coe-Sullivan et al. |
| 2010/0246009 | A1 | 9/2010 | Polley et al. |
| 2010/0265307 | A1 | 10/2010 | Linton et al. |
| 2010/0283036 | A1 | 11/2010 | Coe-Sullivan et al. |
| 2010/0283072 | A1 | 11/2010 | Kazlas et al. |
| 2010/0301360 | A1 | 12/2010 | Van De Ven et al. |
| 2011/0025224 | A1 | 2/2011 | Wood et al. |

FOREIGN PATENT DOCUMENTS

| | | |
|---|---|---|
| EP | 1731583 | 12/2006 |
| EP | 1 909 134 A2 | 4/2008 |
| EP | 1 912 233 A2 | 4/2008 |
| JP | 1260707 | 10/1989 |
| JP | 02-244104 | 9/1990 |
| JP | 04-229807 | 8/1992 |
| JP | 4238304 | 8/1992 |
| JP | 04-281433 | 10/1992 |
| JP | 05-152609 | 6/1993 |
| JP | 05-303017 | 11/1993 |
| JP | 06-238161 | 8/1994 |
| JP | 06-301071 | 10/1994 |
| JP | 07-002912 | 1/1995 |
| JP | 07-176794 | 7/1995 |
| JP | 08-007614 | 1/1996 |
| JP | 09-027642 | 1/1997 |
| JP | 09-050057 | 2/1997 |
| JP | 09-080434 | 3/1997 |
| JP | 10-012925 | 1/1998 |
| JP | 11 224556 A | 8/1999 |
| JP | 2002-216962 | 8/2002 |
| JP | 2006-073869 | 3/2006 |
| WO | WO-2003/070816 | 8/2003 |
| WO | WO-2003/079414 | 9/2003 |
| WO | WO-2006/104689 | 10/2006 |
| WO | WO-2007/002234 | 1/2007 |
| WO | WO-2007/009010 | 1/2007 |
| WO | WO-2007/046649 | 4/2007 |
| WO | WO-2007/136816 | 11/2007 |
| WO | WO-2008029633 | 3/2008 |
| WO | WO-2009/002512 | 12/2008 |
| WO | WO-2009/011922 | 1/2009 |
| WO | WO-2009/014590 | 1/2009 |
| WO | WO-2009/014707 | 1/2009 |
| WO | WO-2009/137053 | 1/2009 |
| WO | WO-2009/145813 | 12/2009 |
| WO | WO-2009/151515 | 12/2009 |
| WO | WO-2010/014205 | 2/2010 |
| WO | WO-2011/020098 | 2/2011 |

OTHER PUBLICATIONS

Coe, S., et al. Electroluminescence from single monolayer of nanocrystals in molecular organic devices, Nature, vol. 420, Dec. 19-26, 2002.
Moeller, G., et al. Quantum-Dot Light-Emitting Devices for Displays, Information Display, Feb. 2006.
Xu, S, et al., Rapid Synthesis of High-Quality InP Nanocrystals, JACS Communications, 2006.
Dunlap, P.N., et al. Design of Particulate Composites of Optical Applciations, Polymer Composites, vol. 12, No. 1, Feb. 1991.
Kumar, S., et al., Synthesis and electrochemical properties of InP nanocrystals, J. Mater. Res., vol. 21, No. 3, Mar. 2006.
Chason, et al., "Free-Standing Quantum Dots for Electronic Applications," Proceedings of SPIE—The International Society for Optical Engineering—Quantum Sensing and Nanophotonic Devices IV 2007 SPIE US, vol. 6479, Feb. 2, 2007, 8 pages.
Florian Kentischer, "PCT International Search Report and Written Opinion," WIPO, ISA/EP, European patent Office, Dec. 3, 2008.
A. Akimov, et al, "Semiconductor nanocrystals in a polymeric matrix: new optical media" Opt. Spectrosc. 72 (4), Apr. 1992.
D.E. Fogg, et al, "Fabrication of Quantum Dot-Polymer Composites-:Semiconductor Nanoclusters in Dual-Function Polymer Matrices with Electron-Transporting and Cluster-Passivating Properties" Macromolecules 1997, 30, 8433-8439.
N. C. Greenham, et al, "Charge seperation and transport in conjugated-polymer/semiconductor-nanocrystal composites studied by photoluminescense quenching and photoconductivity" Physical Review B vol. 54, No. 24, Dec. 15, 1996, pp. 17628-17637.
S.A. Empedocles, et al, "Photoluminescence Spectrosopy of Single CdSe Nanocrystallite Quantum Dots" vol. 77, No. 18, Oct. 28, 1996.
F.V. Mikulec, et al, "Synthesis and Characterization of Highly Luminescent (CdSe)ZnS Quantum Dots" Met. Res. Soc. Symp. Proc. vol. 452 1997 Materials Research Society.
Horst Weller, "Quantized Semiconductor Particles: A Novel State of Matter for Materials Science" Adv. Mater. 1993. 5. No. 2, pp. 88-95.
Jinwook Lee, et al, "Full Color Emission from II-VI Semiconductor Quantum Dot-Polymer Composites" Adv. Mater 2000, 12, No. 15, Aug. 2.
A.V. Firth, et al., "Optical Properties of CdSe nanocrystals in a polymer matrix", Applied Physics Letters, vol. 75, No. 20, 3120 et seq. (1999).
S. Yanagida, et al., "Preparation of Quantized-CdS Doped Poly(Methyl Methacrylate) Films, Optical and Morphotgical Properties", Chem. Lett., pp. 1779-1776, 1990.
T. Yamasaki, et al., "Organic Light-Emitting Device with an Ordered Monolayer of Silica Microspheres as a Scattering Medium", Appl. Phys. Lett. vol. 76, No. 10, Mar. 6, 2000, p. 1243 et seq.
Copy of Office Action dated Mar. 7, 2011 received in U.S. Appl. No. 12/283609 filed Sep. 12, 2008
Dabbousi, et al., Appl. Phys. Lett. 66 (11), Mar. 13, 1995.
Danek, et al., J. Amer. Chem. Soc., 1996.
Hines, et al. J. Phys. Chem., 1996, 100, pp. 468.
Kagan, et al., Physical Review B vol. 54, No. 12 Sep. 15, 1996-II.
Kortan, et al., J. Amer. Chem Soc., 1990, 112, 1327.
Lim, et al. Adv. Mater. 2007, 19, 1927-1932.
Murray et al. J. Am. Chem. Soc. 1993, 115, 8706.
Pang, et al. Optics Express, Jan. 10, 2005 vol. 13, No. 1.
PCT International Report on Patentability, dated Sep. 9, 2008, for PCT/US2007/005589.
PCT International Report on Patentability, dated Sep. 9, 2008, for PCT/US2008/08822
PCT International Report on Patentability, dated Sep. 11, 2008, for PCT/US2008/07902.
PCT International Report on Patentability, dated Nov. 7, 2008, for PCT/US2008/08924.
Rohwer, et al. Proc. Of SPIE vol. 5366 (2004).
Song, et al, Nanotechnology 18 (2007), 055402.
Thoma, et al., Proc. of SPIE col. 5276 (2004), pp. 202 et seq.
Yang, et al. J. Mater Chem., 1997, 7 (1), 131-133.
Ziegler, et al. Adv. Mater. 2008, 20, 4068-4073.

* cited by examiner

FIG. 6  600

APPARATUS FOR SELECTIVELY BACKLIGHTING A MATERIAL

FIELD

The present invention generally relates to electronic devices and more particularly to a method and apparatus for selectively backlighting a material, for example, a key pad, an icon, or a housing of the electronic devices.

BACKGROUND

The market for personal electronic devices, for example, cell phones, personal digital assistants (PDA's), digital cameras, and music playback devices (MP3), is very competitive. Manufactures are constantly improving their product with each model in an attempt to reduce costs. Many times these improvements do not relate directly to the functionality of the product.

The look and feel of personal portable electronic devices is now a key product differentiator and one of the most significant reasons that consumers choose specific models. From a business standpoint, these outstanding designs (form and appearance) increase market share and margin.

In many portable electronic devices, such as mobile communication devices, individual touch keys, keypads, icons for indicating information, or the housing may be lighted. For keys or a simple icon display on the surface of a housing, for example, light emitting diodes have provided light through a small portion of a surface of the housing to illuminate an icon to a user.

However, it is desired to consume as little power as possible while maximizing luminance and achieving a more exact wavelength of the emitted light.

Accordingly, it is desirable to provide a method and apparatus for selectively backlighting a material. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

A combination of light emitting particles formed over a light (radiation) source emitting in the UV or blue spectrum, for example, is used to backlight individual touch keys, keypads, icons, or the housing of an electronic device. In one exemplary embodiment of the light emitting device, an electroluminescent (EL) lamp provides light preferably in the blue spectrum to activate free standing quantum dots (FSQDs) that provide light having a predetermined and specific wavelength. In another exemplary embodiment, a filter is positioned over the light emitting particles to block the light emitted from the light emitting source, thereby ensuring that only light from the light emitting particles emit from the light emitting device. In yet another exemplary embodiment, two light sources are positioned adjacent light emitting particles for modulating the color emitted from the light emitting device. In still another exemplary embodiment, a layer of scattering particles are positioned over the light emitting particles for enabling selective tailoring of color and brightness.

Figure 1:
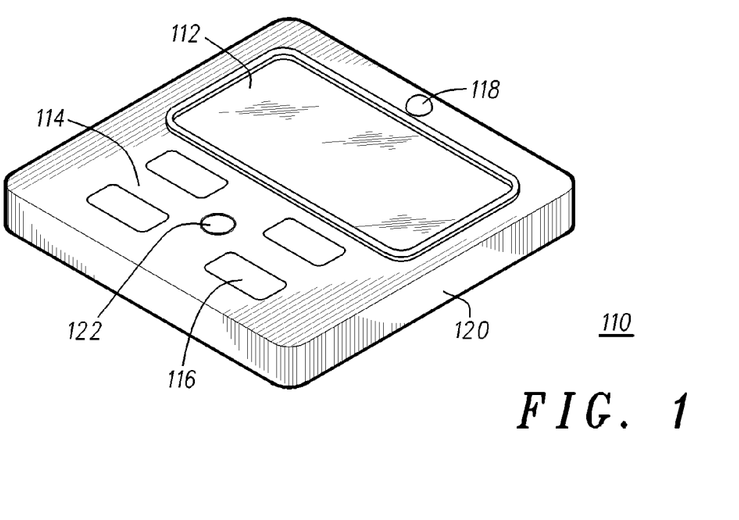
FIG. 1 is an isometric view of a portable communication device configured to incorporate the exemplary embodiments.

Though the electronic device may comprise any device in which an external user interface is desired, FIG. 1 is an isometric view of an electronic device 110 comprising a display 112, a control panel 114 including a plurality of touch keys 116, and a speaker 118, all encased in a housing 120. In some embodiments, an icon 122 may be included for providing an indication of a status when lighted. In accordance with an exemplary embodiment, a light emitting device (subsequently described in detail) provides a backlight for one or more of the individual touch keys 116, the entire control panel 114, or at least a portion of the housing 120. Some electronic devices 110, e.g., a cell phone, may include other elements such as an antenna, a microphone, and a camera (none shown). Furthermore, while the preferred exemplary embodiment of an electronic device is described as a mobile communication device, for example, cellular telephones, messaging devices, and mobile data terminals, other embodiments are envisioned, for example, personal digital assistants (PDAs), computer monitors, gaming devices, video gaming devices, cameras, and DVD players.

Figure 2:
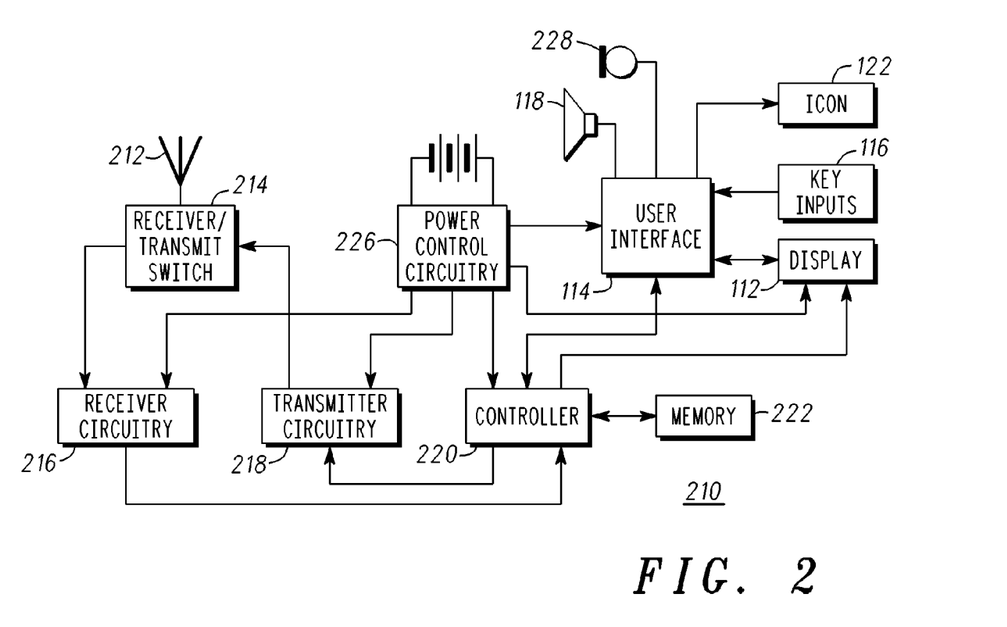
FIG. 2 is a block diagram of one possible portable communication device of FIG. 1.

Referring to FIG. 2, a block diagram of an electronic device 210 such as a cellular phone, in accordance with the exemplary embodiment is depicted. Though the exemplary embodiment is a cellular phone, the display described herein may be used with any electronic device in which information, colors, or patterns are to be presented through light emission. The portable electronic device 210 includes an antenna 212 for receiving and transmitting radio frequency (RF) signals. A receive/transmit switch 214 selectively couples the antenna 212 to receiver circuitry 216 and transmitter circuitry 218 in a manner familiar to those skilled in the art. The receiver circuitry 216 demodulates and decodes the RF signals to derive information therefrom and is coupled to a controller 220 for providing the decoded information thereto for utilization in accordance with the function(s) of the portable communication device 210. The controller 220 also provides information to the transmitter circuitry 218 for encoding and modulating information into RF signals for transmission from the antenna 212. As is well-known in the art, the controller 220 is typically coupled to a memory device 222 and a user interface 114 to perform the functions of the portable electronic device 210. Power control circuitry 226 is coupled to the components of the portable communication device 210, such as the controller 220, the receiver circuitry 216, the transmitter circuitry 218 and/or the user interface 114, to provide appropriate operational voltage and current to those components. The user interface 114 includes a microphone 228, a speaker 118 and one or more touch key inputs 116, and the icon 122. The user interface 114 also includes a display 112 which could receive touch screen inputs.

In accordance with the exemplary embodiments, the controller determines when to activate the backlighting of the user interface 214, icons 116, or housing 120. For example, when a call is received, the backlight may illuminate the housing. Or when a text message is received, the icon may be illuminated to indicate the desired information.

Figure 3:
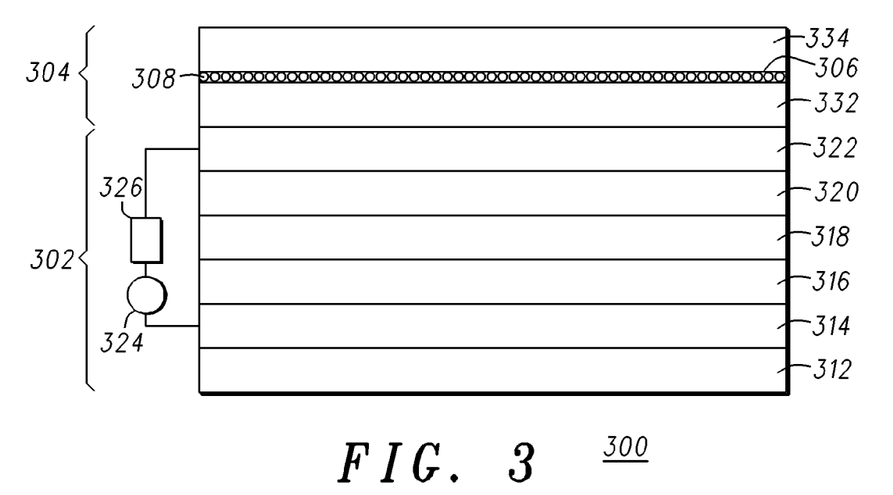
FIG. 3 is a partial cross sectional view of a first exemplary embodiment.

Referring to FIG. 3, a first exemplary embodiment of the backlighting device 300 for backlighting a keypad, an icon, or at least a portion of the housing thereof includes a light emitting device 304 including a layer 306 of light emitting particles 308 formed over a light emitting source 302. The light emitting source 302 may emit light having a wavelength preferably in the UV or blue spectrum, but at least having a wavelength equal to or shorter than the wavelength for which the light emitting particles 308 are capable of emitting. The layer 306 of light emitting particles 308 includes any particles capable of emitting light when activated, including preferably free standing quantum dots (FSQDs).

The light emitting source 302 preferably is an electroluminescent (EL) lamp, which is basically a luminescent capacitor. By applying alternating voltage to the electrodes, phosphor particles that are dispersed in dielectric get excited and emit light. An EL lamp is a solid state, low power, uniform area light source with a thin profile. By applying alternating voltage to the electrodes, phosphor particles that are dispersed in dielectric get excited and emit light through a transparent electrode. EL is an effective thin lighting solution that is used to backlight applications that need to be visible in dark conditions.

EL lamps offer significant advantages over point light sources such as discrete light emitting diodes (LEDs). For example, the high LED count that is required to evenly light large liquid crystal displays (LCDs) consumes more current than an alternative EL backlight system. In addition, LED solutions normally require a complex light guide design to distribute the light more uniformly across the viewing area of a display. This combination of LEDs and light guide is generally three to four times thicker than an EL lamp solution.

EL lamps provide many other advantages over LEDs, including uniform lighting, low power consumption and lower heat emission, a thin profile, flexibility and conformability, emission in a wide range of colors, and reliability.

The light emitting particles 308 in this embodiment are free standing quantum dots (FSQDs), or semiconductor nanocrystallites, whose radii are smaller than the bulk exciton Bohr radius and constitute a class of materials intermediate between molecular and bulk forms of matter. FSQDs are known for the unique properties that they possess as a result of both their small size and their high surface area. For example, FSQDs typically have larger absorption cross-sections than comparable organic dyes, higher quantum yields, better chemical and photo-chemical stability, narrower and more symmetric emission spectra, and a larger Stokes shift. Furthermore, the absorption and emission properties vary with the particle size and can be systematically tailored. It has been found that a Cadmium Selenide (CdSe) quantum dot, for example, can emit light in any monochromatic, visible color, where the particular color characteristic of that dot is dependent on the size of the quantum dot.

FSQDs are easily incorporated into or on other materials such as polymers and polymer composites because FSQDs can be made to be soluble in a variety of media and have little degradation over time. These properties allow FSQD polymers and polymer composites to provide very bright displays, returning almost 100% quantum yield.

Applications for FSQD polymers and polymer composites include point of purchase and point of sale posters, mobile device housings or logos, segmented displays, including ultraviolet (UV) and infrared (IR) displays, absorbers for UV and IR sensors or detectors, and light emitting diodes (LEDs). Although the visible advantages inherent to FSQD polymers and polymer composites are attractive, control of the output (light intensity) is problematic.

Quantum Dots (QDs), also known as nanocrystals or Freestanding Quantum Dots (FSQD), are semiconductors composed of periodic groups of II-VI, III-V, or IV-VI materials, for example, CdS, CdSe, CdTe, ZnS, ZnSe, ZnTe, GaAs, GaP, GaAs, GaSb, HgS, HgSe, HgTe, InAs, InP, InSb, AlAs, AlP, AlSb. Alternative FSQDs materials that may be used include but are not limited to tertiary microcrystals such as InGaP, which emits in the yellow to red wavelengths (depending on the size) and ZnSeTe, ZnCdS, ZnCdSe, and CdSeS which emits from blue to green wavelengths. Multi-core structures are also possible such as ZnSe/ZnXS/ZnS, are also possible where X represents Ag, Sr, Te, Cu, or Mn. The innermost core is made of ZnSe, followed by the second core layer of ZnXS, completed by an external shell made of ZnS.

FSQDs range in size from 2-10 nanometers in diameter (approximately $10^2$-$10^7$ total number of atoms). At these scales, FSQDs have size-tunable band gaps, in other words there spectral emission depends upon size. Whereas, at the bulk scale, emission depends solely on the composition of matter. Other advantages of FSQDs include high photoluminescence quantum efficiencies, good thermal and photo-stability, narrow emission line widths (atom-like spectral emission), and compatibility with solution processing. FSQDs are manufactured conventionally by using colloidal solution chemistry.

FSQDs may be synthesized with a wider band gap outer shell, comprising for example ZnO, ZnS, ZnSe, ZnTe, CdO, CdS, CdSe, CdTe, MgS, MgSe, GaAs, GaN, GaP, GaAs, GaSb, HgO, HgS, HgSe, HgTe, InAs, InN, InP, InSb, AlAs, AlN, AlP, AlSb. The shell surrounds the core FSQDs and results in a significant increase in the quantum yield. Capping the FSQDs with a shell reduces non-radiative recombination and results in brighter emission. The surface of FSQDs without a shell has both free electrons in addition to crystal defects. Both of these characteristics tend to reduce quantum yield by allowing for non-radiative electron energy transitions at the surface. The addition of a shell reduces the opportunities for these non-radiative transitions by giving conduction band electrons an increased probability of directly relaxing to the valence band. The shell also neutralizes the effects of many types of surface defects. The FSQDs are more thermally stable than organic phosphors since UV light will not chemically breakdown FSQDs. The exterior shell can also serve as an anchor point for chemical bonds that can be used to modify and functionalize the surface.

Due to their small size, typically on the order of 10 nanometers or smaller, the FSQDs have larger band gaps relative to a bulk material. It is noted that the smaller the FSQDs, the higher the band gap. Therefore, when impacted by a photon (emissive electron-hole pair recombination), the smaller the diameter of the FSQDs, the shorter the wavelength of light will be released. Discontinuities and crystal defects on the surface of the FSQD result in non-radiative recombination of the electron-hole pairs that lead to reduced or completely quenched emission of the FSQD. An overcoating shell, e.g., ZnS, having a thickness, e.g., of up to 5 monolayers and higher band gap compared to the core's band gap is optionally provided around the FSQDs core to reduce the surface defects and prevent this lower emission efficiency. The band gap of the shell material should be larger than that of the FSQDs to maintain the energy level of the FSQDs. Capping ligands (molecules) on the outer surface of the shell allow the FSQDs to remain in the colloidal suspension while being grown to the desired size. The FSQDs may then be placed within the display by a printing process, for example. Additionally, a light (radiation) source (preferably a ultra violet (UV) source) is disposed to selectively provide photons to strike the FSQDs, thereby causing the FSQDs to emit a photon at a frequency comprising the specific color as determined by the size tunable band gap of the FSQDs.

A layer comprising a plurality of FSQDs disposed between an electron transport layer (or hole blocking layer) and a hole transport layer. Application of a voltage potential across the structure will create a saturation of a larger population of electron or hole pairs (excitons) that quenches the emission of the photonicly excited emission. The light from the light source excites electrons from the ground state of the FSQDs into a higher electric energy/vibration state. The applied electric field of the voltage potential injects the electrons into free holes (including those in the ground energy state), prohibiting the electrons in a higher energy state to return to the ground energy state. Since photon emission only occurs when the electron relaxes into the ground-level energy state, photon emission is reduced. The level of photon emission from the FSQDs may be controlled by varying the voltage potential.

The exemplary embodiments described herein may be fabricated using known lithographic processes as follows. The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

Though various lithography processes, e.g., photolithography, electron beam lithography, and imprint lithography, ink jet printing, may be used to fabricate the light emitting device, a printing process is preferred. In the printing process, the FSQD ink in liquid form is printed in desired locations on the substrate. Ink compositions typically comprise four elements: 1) functional element, 2) binder, 3) solvent, and 4) additive. Graphic arts inks and functional inks are differentiated by the nature of the functional element, i.e. the emissive quantum dot. The binder, solvent and additives, together, are commonly referred to as the carrier which is formulated for a specific printing technology e.g. tailored rheology. The function of the carrier is the same for graphic arts and printed electronics: dispersion of functional elements, viscosity and surface tension modification, etc. One skilled in the art will appreciate that an expanded color range can be obtained by using more than three quantum dot inks, with each ink having a different mean quantum dot size. A variety of printing techniques, for example, Flexo, Gravure, Screen, inkjet may be used. The Halftone method, for example, allows the full color range to be realized in actual printing.

The following detailed description is merely exemplary in nature and is not intended to limit the invention or the application and uses of the invention. Furthermore, there is no intention to be bound by any theory presented in the preceding background or the following detailed description.

In a first exemplary embodiment of the backlighting device 300, depicted in FIG. 3, an EL device (light emitting source) 302 includes a substrate 312 that has a bottom electrode 314 situated thereon. The substrate 312 and electrode 314 do not need to be optically transmissive, because the light is emitted from the opposite side of the device 302, that is, not through the substrate and electrode. A layer of electroluminescent material 318 (phosphor) and a dielectric layer 316 are situated between the bottom electrode 314 and a top electrode 322. A source of alternating voltage 324 is coupled to the top and bottom electrodes to energize the electroluminescent material when selected by activation of the switch 326. An optically transmissive insulating or dielectric layer 320 is disposed between the top electrode and the phosphor 318.

The light emitting device 304 includes a substrate 332 that includes one or more layer, typically provided as support for a layer 306 of FSQDs 308, or protection of device 302, or both. The substrate 332 is formed of a transparent, sturdy, thin material such as glass, ceramic, insulated metal, but may comprise a flexible polymer such as polyethylene terephthalate (PET) or polyethylene naphthalate (PEN). An optional structure 334 is provided as a protective layer over the layer 306.

When the layer 306 of the plurality of FSQDs 308 are impacted with light, from the EL device 302, having a wavelength shorter than that which would be emitted by the FSQDs 308, an electron in each of the FSQDs 308 so impacted is excited to a higher level. When the electron falls back to its ground state, a photon is emitted having a wavelength determined by the diameter of the FSQD 308.

It is understood that the light source 302 may be positioned in any location wherein its output may be applied to the light emitting device 304, and may comprise any frequency below that provided as output from the FSQDs 308, but preferably comprises either a wavelength in the blue or ultraviolet (UV) spectrum. It is recognized that the substrate 332 may comprise a rigid structure or a flexible structure.

Figure 4:
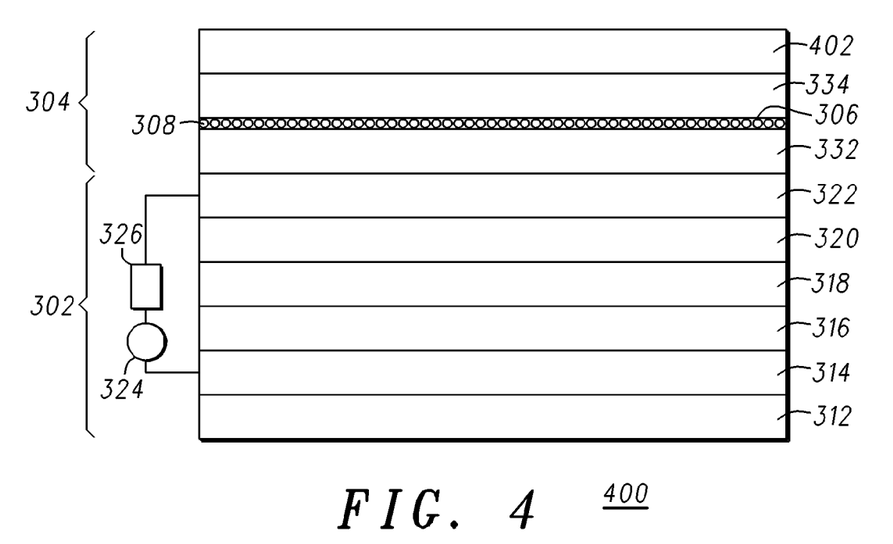
FIG. 4 is a partial cross sectional view of a second exemplary embodiment.

FIG. 4 is a partial cross section of a second exemplary embodiment of a backlighting device 400 having a filter 402 disposed over the backlighting device 300 as shown in FIG. 3 (elements in FIG. 4 similar to those of FIG. 3 have the same reference numeral). The filter 402 filters the light emitted from the EL device 302, thereby allowing only the light from the FSQDs 308 to be emitted from the backlighting device 400. For example, if the EL device 302 emits blue light and the FSQDs 308 emit red light, the filter will block the blue light. Only the red light will be emitted from the backlighting device 400. It will be appreciated by one skilled in the art that other constructions are possible. For example, filter 402 may be placed between layer 302 and layer 306 when device 302 has substantial emission in the UV. In this case, filter 402 transmits the desired UV radiation, but blocks the visible radiation. Other configurations with multiple filters are also possible. Furthermore, the filter 402 may function as a protective layer, eliminating the need for the layer 334.

Figure 5:
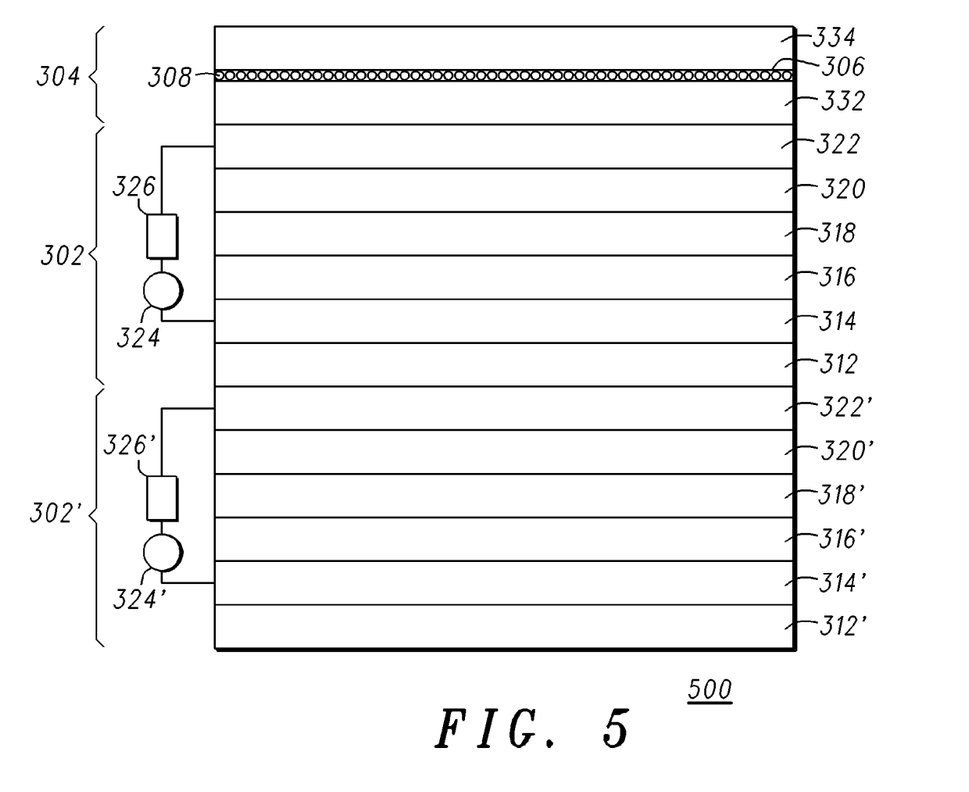
FIG. 5 is a partial cross sectional view of a third exemplary embodiment.

FIG. 5 is a partial cross section of a third exemplary embodiment of a backlighting device 500 having a second EL device (light emitting source) 302' disposed on the bottom of the backlighting device 300, and more specifically on the bottom of the EL device 302 opposed to the light emitting device 304 (elements in FIG. 5 similar to those of FIG. 3 have the same reference numeral). In this embodiment, EL device 302 and light emitting device 304 will be transparent to the wavelength of light emitting from EL device 302'.

An example of the operation of this third exemplary embodiment is where the EL device 302' produces green light, the EL device 302 produces mostly blue light with elements of green, and the FSQDs 308 have a diameter that produces green light (note the wavelength of blue is shorter than green). The blue light from the EL device 302 excites the FSQDs 308, thereby causing green light to be emitted from the backlighting device 500. Any green light emitted from the EL device 302' will not be absorbed by the FSQDs and will also be emitted from the backlighting device 500. The voltages 324, 324' may be adjusted for controlling the intensity of the green light emitted from the backlighting device 500. It will be appreciated by one skilled in the art that all electrodes and substrates in device 302 should be transmissive in some degree to the emitted radiation from device 302'. Or, in some manner, the light from device 302' is passed to the viewer in combination with the light emitted from layer 308. A benefit from this construction is that multiple colors can be obtained by combining colors from layer 308 and devices 302 and 302'.

Figure 6:
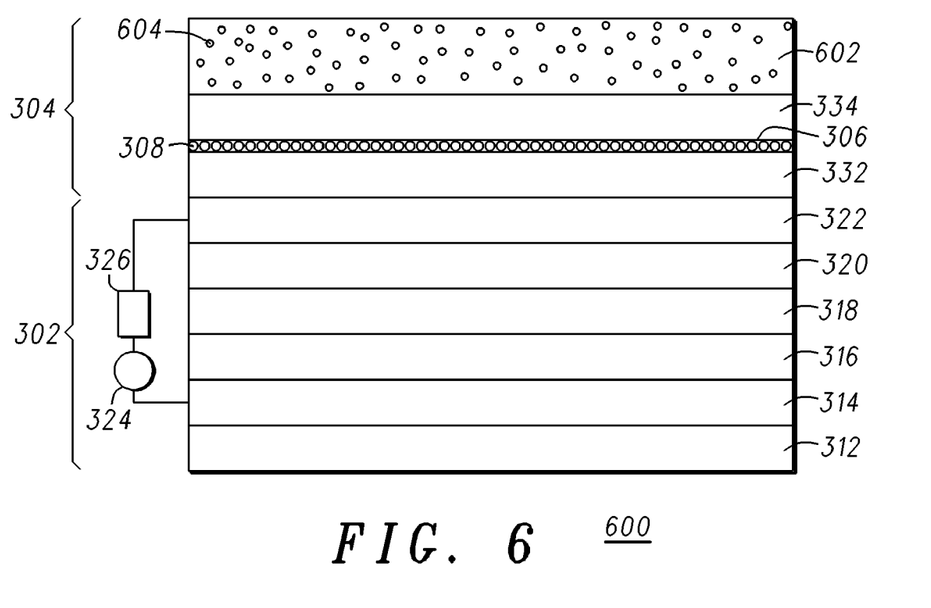
FIG. 6 is a partial cross sectional view of a fourth exemplary embodiment.

FIG. 6 is a partial cross section of a fourth exemplary embodiment of a backlighting device 600 having a layer 602 including scattering particles 604 disposed over the backlighting device 300 as shown in FIG. 3 (elements in FIG. 6 similar to those of FIG. 3 have the same reference numeral). The scattering particles 604 may be of different dimensions, but will have a diameter equal to or smaller than the scattered radiation wavelength. Therefore, the scattering particles 604 will scatter the light from the EL device 302 away from the viewer (and any ambient light entering the backlighting device 600 back toward the viewer), but will not scatter the light from the FSQDs 308 toward the viewer. This scattering will allow for a light emitted from the backlighting device 600 to be more closely aligned with the wavelength of the FSQDs 308 and enhances the brightness from layer 306 in cases where backscattering of ambient light toward the viewer is desirable. It should be recognized that the layer of photon emitting particles 308, in addition to FSQDs, may alternatively comprise other photon emitting material such as phosphorous particles.

The FSQDs 308 in any of the embodiments may include FSQDs having two or more wavelengths, which would provide various desired colors depending on the size of the FSQDs and/or a mix of different compositions of matter. Furthermore, the EL devices 302, 302' could include a plurality of segments, each emitting a different color.

This scattering, known as Mie and Rayleigh scattering, may be accomplished by integrating particles into a polymeric, e.g., silicone, key pad to enable selective tailoring of key pad color and brightness. The scattering particles may be formed over the light emissive particles, as shown in FIG. 6, or mixed in with the light emissive particles. Rayleigh scattering, which is a limiting case of Mie scattering, is applicable when the radius (r) of the scattering sphere is much smaller than the wavelength (lambda) of the incident light. This represents a practical lower limit to the size of the scattering particles.

The amount of Rayleigh scattering that occurs to light is dependent upon the size of the particles and the wavelength of the light. The scattering coefficient, and therefore the intensity of the scattered light, varies for small size parameter inversely with the fourth power of the wavelength. The intensity I of light scattered by small particles from a beam of unpolarized light of wavelength $\lambda$ and intensity $I_0$ is given by:

$$I = I_0 \times N_0 \times \frac{1+\cos^2\theta}{2R^2}\left(\frac{2\pi}{\lambda}\right)^4\left(\frac{n^2-1}{n^2+1}\right)^2\left(\frac{d}{2}\right)^6$$

where R is the distance to the scattering particles, $\theta$ is the scattering angle, n is the refractive index of the particle, $N_0$ is Avogadro's number, and d is the diameter of the particle. For example, in the ideal case $I/I_0=1$ (no losses), $\theta=0$ (direct view), R=8 inches (2.03 E8 nm) (typical distance), $\lambda=630$ nm (wavelength for the color red), $n=n_2/n_1$, $n_1=1.41$ (silicone), and $n_2=1.45716$ (silica), the particle size d=9.8 nanometers.

The strong wavelength dependence of the scattering ($\sim\lambda^{-4}$) means that blue light is scattered much more than red light, i.e., scattering is more effective at short wavelengths. Furthermore, Rayleigh and Mie scattering can be considered to be elastic scattering since the photon energies of the scattered photons is not changed. Mie scattering is less dependent on wavelength and is more effective when the size of the particle approaches the wavelength of the radiation to be scattered. Mie scattering represents a practical upper boundary for forward scattering the light. Thus, to forward scatter 630 nm light a practical particle size range is between 10 nm and 630 nm.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A backlighting device for emitting light having a first wavelength, comprising:
   an electroluminescent lamp for emitting radiation having a second wavelength;
   a layer of quantum dots emitting light having the first wavelength in response to the emitted radiation of the electroluminescent lamp, the first wavelength being larger than the second wavelength; and
   a layer of scattering particles disposed over the layer of quantum dots that scatters the radiation and light having wavelength other that the first wavelength.

2. The backlighting device of claim 1 further comprising a transparent material overlying the layer of quantum dots through which the light having a first wavelength passes.

3. The backlighting device of claim 1 further comprising a filter disposed over the layer of quantum dots that prevents the radiation having a second frequency from passing through while allowing the light to pass through.

4. A backlighting device for emitting light having a first wavelength, comprising:
   an electroluminescent lamp for emitting radiation having a second wavelength;
   a layer of quantum dots emitting light having the first wavelength in response to the emitted radiation of the electroluminescent lamp, the first wavelength being larger than the second wavelength; and
   a radiation emission device disposed on a side of the electroluminescent lamp opposed to the layer of quantum dots for emitting light having the first wavelength.

5. The backlighting device of claim 4 further comprising a transparent material overlying the layer of quantum dots through which the light having a first wavelength passes.

6. The backlighting device of claim 4 further comprising a filter disposed over the layer of quantum dots that prevents the radiation having a second wavelength from passing through while allowing the light to pass through.

7. A backlighting device for emitting light having a first wavelength, comprising:
an electroluminescent lamp for emitting radiation having a second wavelength;
a layer of quantum dots emitting light having the first wavelength in response to the emitted radiation of the electroluminescent lamp, the first wavelength being larger than the second wavelength; and
further comprising a transparent material further comprising a transport material wherein the transparent material comprises one of a touch key, an icon, and at least a portion of a housing of an electronic device.

8. The backlighting device of claim 7 further comprising a transparent material overlying the layer of quantum dots through which the light having a first wavelength passes.

9. The backlighting device of claim 7 wherein the layer of quantum dots further comprises phosphorus particles.

10. The backlighting device of claim 7 further comprising a filter disposed over the layer of quantum dots that prevents the radiation having a second wavelength from passing through while allowing the light to pass through.

11. A backlighting device emitting light having a first wavelength, comprising:
an electroluminescent lamp for emitting radiation having a second wavelength;
a layer of a plurality of free standing quantum dots emitting light having the first wavelength in response to being impacted by the radiation having a second wavelength, the first wavelength being larger than the second wavelength; and
a layer including scattering particles disposed over the layer of free standing quantum dots that scatters the radiation having a second wavelength.

12. A backlighting device emitting light having a first wavelength, comprising:
a first electroluminescent lamp for emitting radiation having a second wavelength;
a layer of a plurality of free standing quantum dots emitting light having the first wavelength in response to being impacted by the radiation having a second wavelength, the first wavelength being larger than the second wavelength; and comprising a second electroluminescent lamp disposed contiguous to the first electroluminescent lamp, for emitting light having the first wavelength.

13. The backlighting device of claim 12 further comprising a transparent material overlying the layer of free standing quantum dots, wherein the light having a first wavelength passes through the transparent material.

14. The backlighting device of claim 12 further comprising a filter disposed over the layer of a plurality of free standing quantum dots that prevents the radiation having a second wavelength from passing through while allowing the light having a first wavelength to pass through.

15. A backlighting device emitting light having a first wavelength, comprising:
an electroluminescent lamp for emitting radiation having a second wavelength; and
a layer of a plurality of free standing quantum dots emitting light having the first wavelength in response to being impacted by the radiation having a second wavelength, the first wavelength being larger than the second wavelength;
further comprising a transparent material further comprising a transport material wherein the transparent material comprises one of a touch key, an icon, and at least a portion of a housing of an electronic device.

16. A backlighting device emitting light having a first wavelength, comprising:
an electroluminescent lamp for emitting radiation having a second wavelength;
a layer of quantum dots and phosphorus particles emitting light having the first wavelength in response to the emitted radiation of the electroluminescent lamp, the first wavelength being larger than the second wavelength; and
further comprising a transparent material further comprising a transport material wherein the transparent material comprises one of a touch key, an icon, and at least a portion of a housing of an electronic device.

17. The backlighting device of claim 16 further comprising a transparent material overlying the layer of quantum dots and phosphorus particles, wherein the light having a first wavelength passes through the transparent material.

18. The backlighting device of claim 16 further comprising a filter disposed over the layer of quantum dots and phosphorus particles that prevents the radiation having a second wavelength from passing through while allowing the light to pass through.

19. A backlighting device emitting light having a first wavelength, comprising:
an electroluminescent lamp for emitting radiation having a second wavelength;
a layer of quantum dots and phosphorus particles emitting light having the first wavelength in response to the emitted radiation of the electroluminescent lamp, the first wavelength being larger than the second wavelength; and
a layer including scattering particles disposed over the layer of quantum dots and phosphorus particles that scatters the radiation and light having wavelength other than the first wavelength.

20. A backlighting device emitting light having a first wavelength, comprising:
an electroluminescent lamp for emitting radiation having a second wavelength; and
a layer of quantum dots and phosphorus particles emitting light having the first wavelength in response to the emitted radiation of the electroluminescent lamp, the first wavelength being larger than the second wavelength; and
a radiation emission device disposed on a side of the electroluminescent lamp opposed to the layer of quantum dots and phosphorus particles, for emitting light having the first wavelength.

* * * * *